United States Patent [19]
Rush, II et al.

[11] Patent Number: 5,150,669
[45] Date of Patent: Sep. 29, 1992

[54] PRESSURE RELIEF MEANS FOR INTEGRATED INDUCTION SYSTEM

[75] Inventors: William B. Rush, II, Clarkston; Jack E. Elder, Rochester; Richard K. Shier, Livonia, all of Mich.

[73] Assignee: General Motors Corporation, Detroit, Mich.

[21] Appl. No.: 575,532

[22] Filed: Aug. 30, 1990

Related U.S. Application Data

[63] Continuation-in-part of Ser. No. 432,295, Nov. 6, 1989, Pat. No. 5,003,933.

[51] Int. Cl.⁵ .............................................. F02B 75/26
[52] U.S. Cl. ............................... 123/52 MF; 137/527
[58] Field of Search ................ 123/52 MF, 73 V; 137/527

[56] References Cited

U.S. PATENT DOCUMENTS

| | | | |
|---|---|---|---|
| 1,668,456 | 5/1928 | Jennings | 137/527 |
| 3,612,098 | 10/1971 | Bora | 137/527 |
| 4,768,487 | 9/1988 | Yamamoto et al. | 123/470 |
| 4,773,358 | 9/1988 | Heath | 123/52 MF |
| 4,776,313 | 10/1988 | Freismuth et al. | 123/470 |
| 4,805,564 | 2/1989 | Hudson, Jr. | 123/52 |
| 4,867,110 | 9/1989 | Distelrath | 123/52 |
| 5,009,199 | 4/1991 | MacFarlane | 123/52 MF |
| 5,018,486 | 5/1991 | Davis et al. | 123/52 MF |
| 5,046,686 | 9/1991 | Carla et al. | 137/527 |
| 5,094,194 | 3/1992 | Rush, II et al. | |

FOREIGN PATENT DOCUMENTS 0095251A  11/1983  European Pat. Off. .

Primary Examiner—E. Rollins Cross
Assistant Examiner—M. Macy
Attorney, Agent, or Firm—Gordon F. Belcher

[57] ABSTRACT

An integrated induction system for providing fluids to the cylinders in an engine comprises a casing adapted for mounting on the engine. The casing has an air inlet and a plurality of fluid outlets. A plurality of air tubes are disposed within the casing so that air entering the air inlet flows through the air tubes and respective fluid outlets to the cylinders. A fuel injection assembly is mounted within the casing to inject fuel into the air exiting the air tubes adjacent each of the fluid outlets causing a mixture of air and fuel to enter the respective cylinders. Provision is made for venting the casing when the pressure therein reaches or exceeds a predetermined limit.

5 Claims, 6 Drawing Sheets

5,150,669

PRESSURE RELIEF MEANS FOR INTEGRATED INDUCTION SYSTEM

This is a continuation-in-part of copending application Ser. No. 432,295 filed Nov. 6, 1989 and issued Apr. 2, 1991 as U.S. Pat. No. 5,003,933 and assigned to the same assignee.

TECHNICAL FIELD

This invention relates to a pressure relief device and, more particularly, to a pressure relief device for an integrated induction system for delivering fluids to the cylinders of an engine.

BACKGROUND

Intake manifolds commonly deliver air to the cylinders of an engine. Other fluids are typically delivered to the cylinders of an engine by systems connected to or separate from the intake manifold, such as fuel injection systems, exhaust gas recirculation systems, positive crankcase ventilation systems and fuel tank vapor systems. The components for these various systems are commonly assembled separately from the intake manifold and individually mounted on the engine or manifold.

Separate assembly of the intake manifold and the various fluid delivery system components can entail considerable difficulty and expense due to the interdependency of the various systems. Proper alignment, tight connections and fully coordinated control systems are often critical to the optimum functioning of the various systems. Such design and manufacturing requirements can be difficult to meet when separately assembling the various system assemblies and mounting them on an engine. For similar reasons, mounting the assembled components of these various systems as separate assemblies can also require substantial effort and expense. Also, the fluid delivery systems described above typically include many relatively small and fragile components.

SUMMARY OF THE INVENTION

The present invention provides a pressure relief means for an integrated induction system which contains in one assembly many of the components of the various fluid delivery systems of an engine.

The integrated induction system comprises a casing adapted for mounting on the engine. The casing has an air inlet and a plurality of fluid outlets. Each of the fluid outlets is adapted to communicate with a respective cylinder in the engine. A plurality of air tubes are disposed within the casing with the air tubes occupying a portion of the interior of the casing and the unoccupied portion of the casing constituting a plenum. The air tubes are positioned within the casing so that the plenum provides a flow path from the air inlet to the air tubes. One end of each of the air tubes opens from the plenum and the other end engages the casing adjacent one of the fluid outlets to allow communication between the plenum and the cylinders in the engine. Air entering into the plenum through the air inlet is thereby introduced via each of the air tubes into the respective cylinders. A fuel injection assembly is mounted within the casing to inject fuel into the air exiting the air tubes adjacent each of the fluid outlets to cause a mixture of air and fuel to enter the respective cylinders.

Provision is made for venting the casing when the pressure therein reaches or exceeds a predetermined limit. This limits the maximum pressure inside the casing.

These and other features and advantages of the invention will be more fully understood from the following description of certain specific embodiments of the invention taken together with the accompanying drawings.

BRIEF DRAWING DESCRIPTION

In the drawings.

Corresponding reference characters indicate corresponding parts throughout the several views of the drawings.

DETAILED DESCRIPTION

Figure 1:
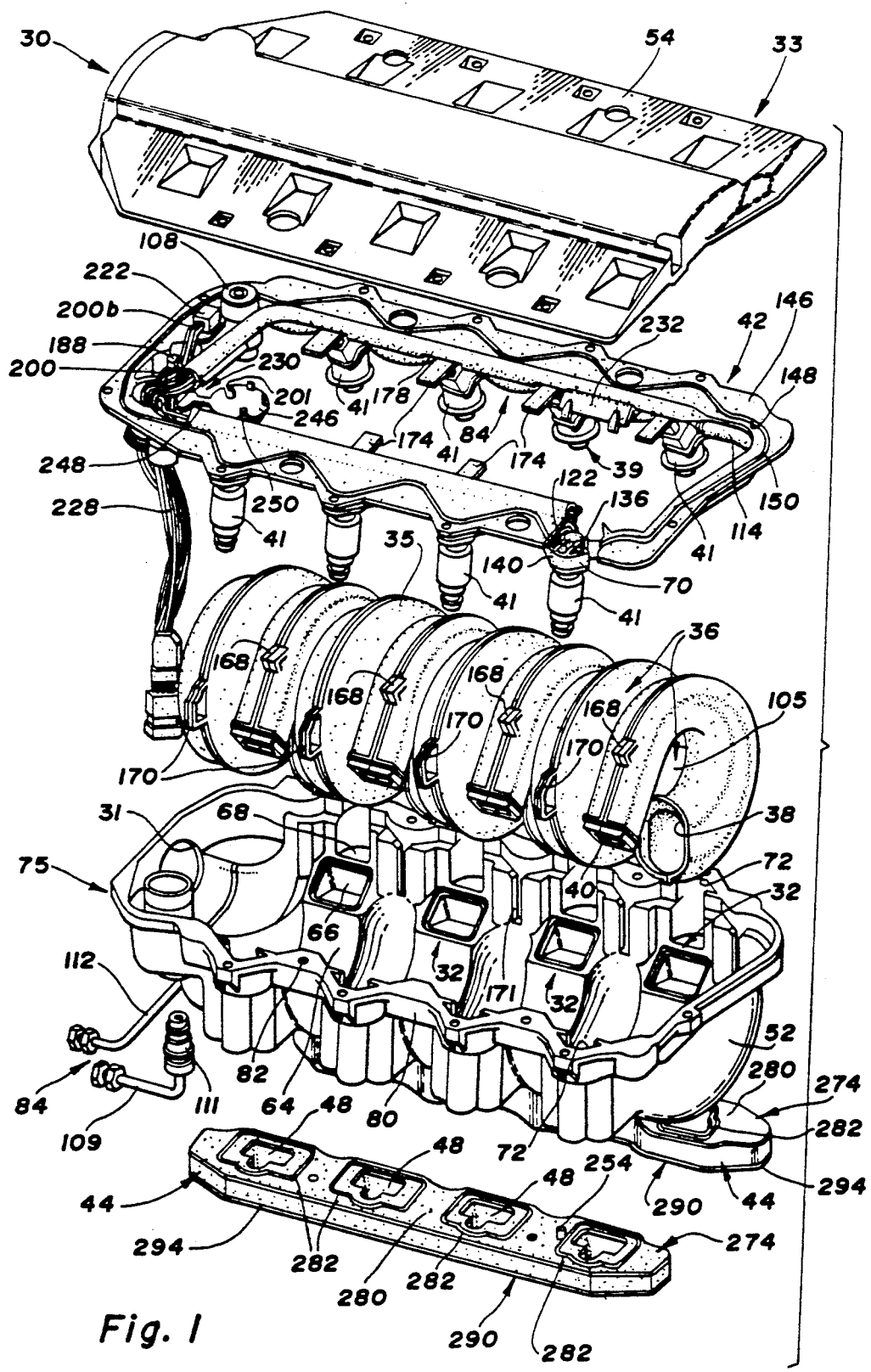
FIG. 1 is an exploded view of an integrated induction system in accordance with the present invention.
Figure 2:
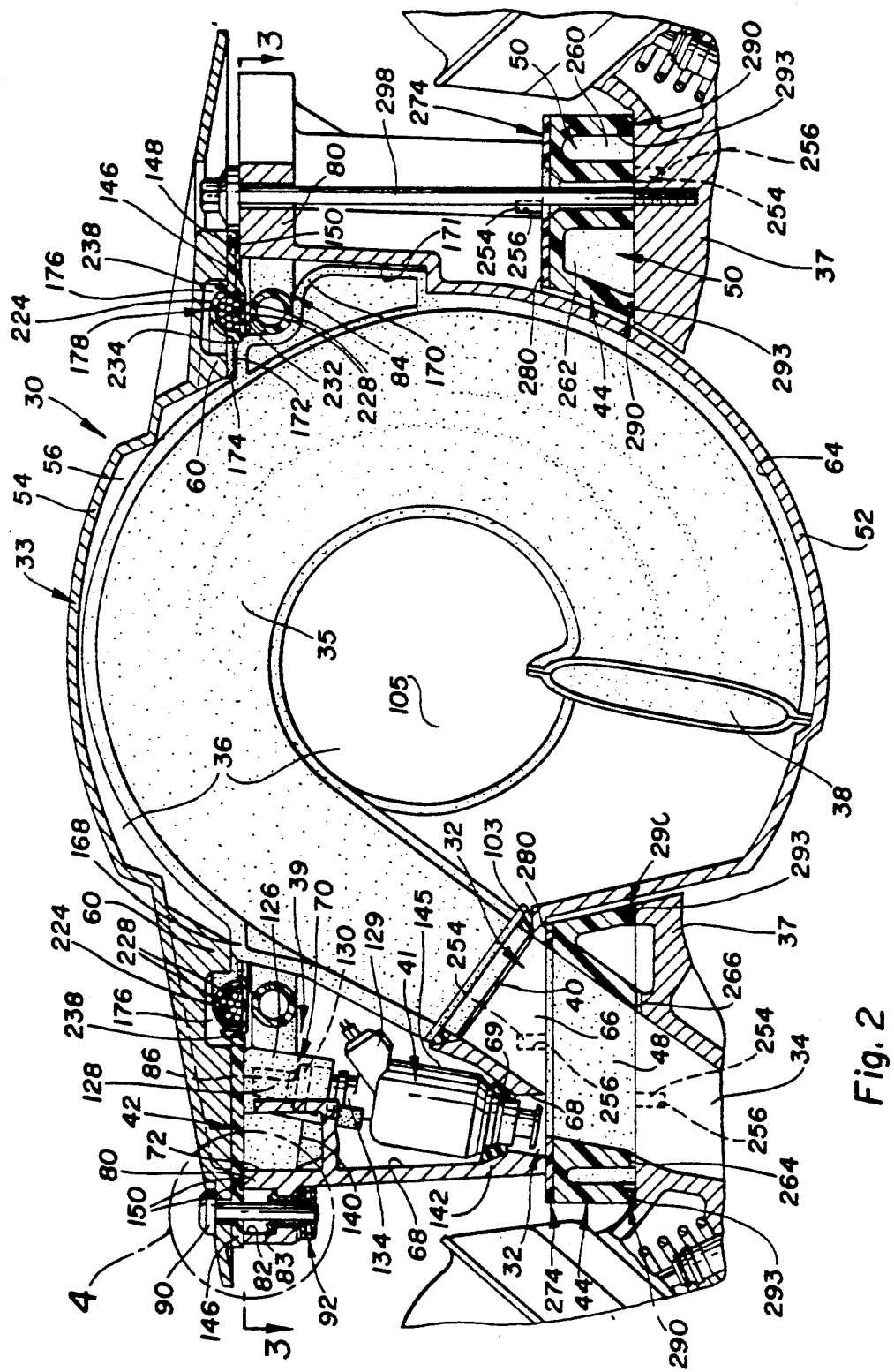
FIG. 2 is an enlarged transverse sectional view of the integrated induction system of FIG. 1 generally in a plane between air tubes showing some components in assembly.
Figure 3:
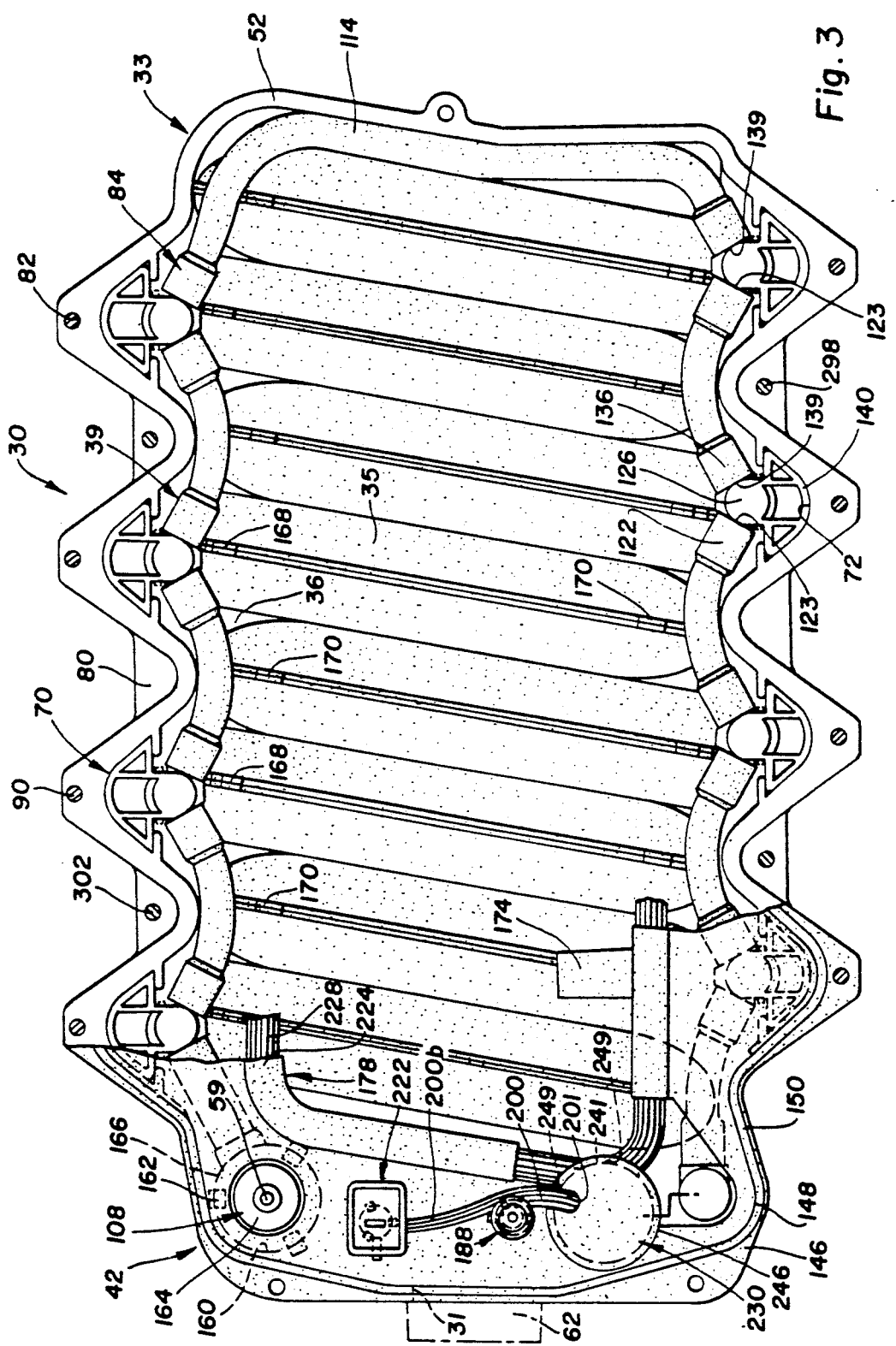
FIG. 3 is a plan view in the plane indicated by line 3—3 of FIG. 2 with the cover removed and part of the carrier being broken away showing some components in assembly.
Figure 6:
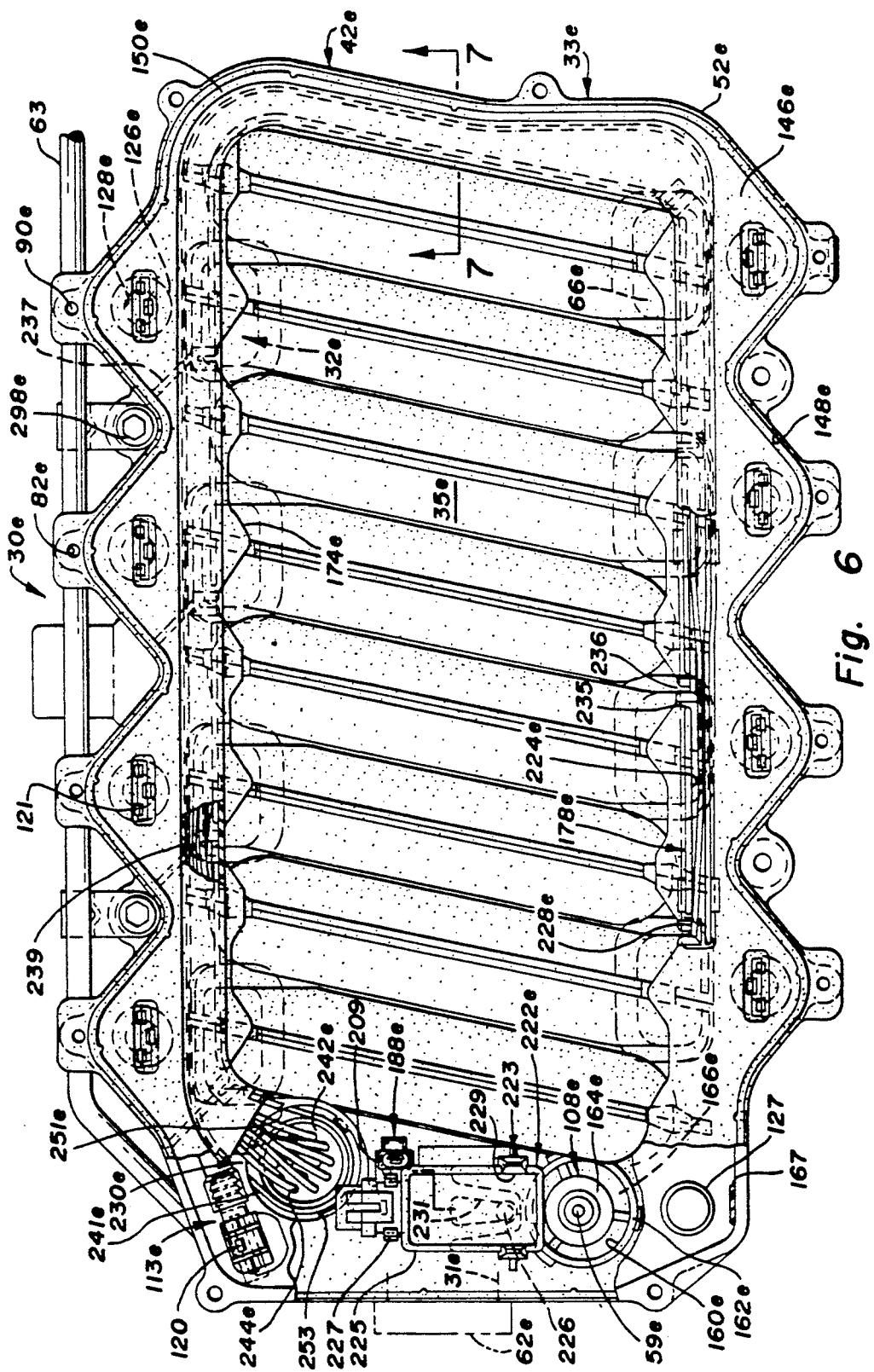
FIG. 6 is plan view corresponding to FIG. 3 showing an alternative embodiment of the integrated induction system.

Referring now to FIGS. 1, 2 and 3 of the drawings, numeral 30 generally indicates an integrated induction system of the present invention to provide air, fuel and other fluids to the cylinders in the engine. An alternative embodiment of the integrated induction system 30e is shown in FIG. 6. Parts similar to those shown in FIGS. 1, 2 and 3 have the same reference numeral with the addition of the suffix e. Briefly, the integrated induction system 30 comprises a casing 33, a plurality of air tubes 35 disposed within the casing and a fuel injection assembly 39 mounted within the casing. The casing 33 has an air inlet 31 enabling air to enter the casing and a plurality of fluid outlets 32 enabling fluids to exit the casing. The fluid outlets 32 are formed in the casing 33 so that, when the casing is mounted on the cylinder heads 37, each fluid outlet 32 communicates with a respective cylinder inlet 34.

The air tubes 35 occupy a portion of the interior volume of the casing 33 with the unoccupied portion of the casing constituting a plenum 36. The air tubes 35 are positioned in the casing 33 so that the plenum 36 provides a flow path from the air inlet 31 to the air tubes. One end of each air tube 35, constituting the air tube inlet 38, opens from the plenum 36. The other end of the air tube 35, constituting the air tube outlet 40, engages the casing 33 adjacent a respective fluid outlet 32 to allow communication between the plenum 36 and a respective cylinder. Air entering into the plenum 36 through the air inlet 31 is thereby introduced via each of the air tubes 35 into the respective cylinders.

The fuel injection assembly 39 includes a fuel injector 41 directed toward each fluid outlet 32. The fuel injectors 41 inject fuel into the air exiting the air tubes 35 adjacent the fluid outlets 32 to cause a mixture of air and fuel to enter the respective cylinders. The integrated induction system 30 may also include a carrier 42 connected to the fuel injection assembly 39 and other components contained within the casing 33.

The casing 33 may be supported on distribution mountings 44 disposed between it and the cylinder heads 37. Each distribution mounting 44 has mounting passages 48 which allow communication between the casing and cylinders to enable the air and fuel inside the casing to enter the cylinders.

Casing

As shown in FIGS. 1 and 2, the casing 33 comprises an enclosure defined by a shell 52 and a cover 54. The cover 54 is removable to provide access to the interior of the casing 33.

As shown in FIG. 1, the shell 52 has an air inlet 31 comprising an opening formed in one end of the shell adjacent its top. The outer surface of the shell 52 adjacent the air inlet 31 is flat to enable a throttle body 62, shown in FIG. 3, or other air metering device to be mounted on it to regulate the flow of air into the casing 33.

As shown in FIGS. 1 and 2, the shell 52 has fluid outlets 32 comprising openings formed in the bottom of the shell adjacent its sides. The fluid outlets 32 mate with respective mounting passages 48 to allow communication between the inside of the casing 33 and the cylinders. The inner rows of fluid outlets 32 allow communication between the air tubes 35 and the cylinders and constitute the air outlets 66. The outer rows of fluid outlets 32 allow communication between the fuel injectors 41 and the cylinders and are constituted by openings in injector seats 68. The injector seats 68 are cup shaped to support the outlet of each fuel injector 41 mounted within it so that fuel can exit the fuel injector and flow through the opening in the seat base 69 toward the cylinder inlet 34e. The shell 52 also has a pod socket 72 adjacent each injector seat 68 to provide a mounting for the fuel injection assembly 39.

As shown in FIG. 1, a casing flange 80 is formed in the sides of the shell 52 adjacent its upper edge to serve as a mounting for the cover 54. As shown in FIGS. 1 and 2, each casing flange 80 has a plurality of connecting bores 82. Each connecting bore 82 has an enlarged upper portion, producing a step 83 for connection of a spring clip 92. Threaded connecting bolts 90 extend through openings in the cover 54 into each connecting bore 82. The spring clip 92 has internal threads corresponding to the external threads on the connecting bolts 90. This enables each connecting bolt 90 to be screwed into a respective spring clip 92 adjacent the casing flange 80 to hold the cover 54 against the shell 52.

The cover 54 and shell 52 are constructed of die cast magnesium using an AZ91HP magnesium alloy. The cover 54 and shell 52 may also be constructed of aluminum, plastic or other forms of magnesium.

Figure 4:
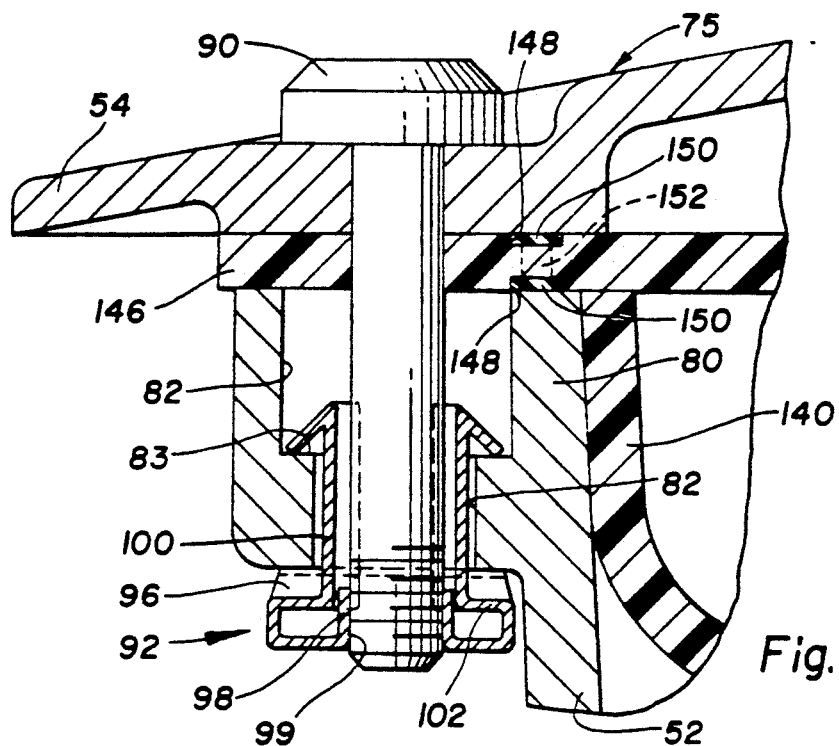
FIG. 4 is an enlarged view of circled portion 4 of FIG. 2 showing a spring clip.
Figure 5:
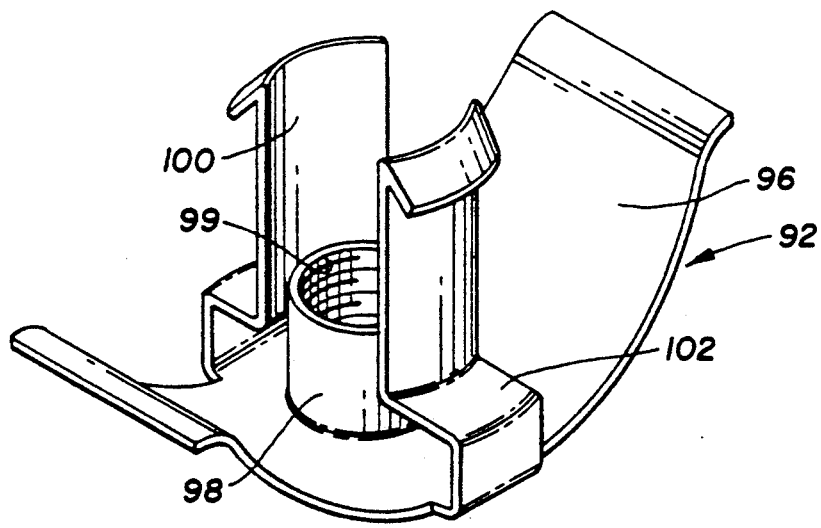
FIG. 5 is a perspective view of the spring clip of FIG. 4.

As shown in FIGS. 4 and 5, the spring clip 92 comprises a U-shaped resilient member 96 formed from a flat metal strip. The ends of the U-shaped member 96 engage the casing flange 80 on opposite sides of each connecting bore 82 so that the portion of the U-shaped member between its ends is spaced apart from the casing flange. A boss 98 with a clip bore 99 extends from the inner portion of the U-shaped member 96 in a radial direction so that the clip bore is coaxially aligned with the connecting bore 82. The clip bore 99 has internal threads which correspond to the external threads on the connecting bolts 90.

A pair of elongate clip members 100 extend upward from the inner portion of the U-shaped member 96 into the connecting bore 82. A portion of each clip member 100 is bent inward between its end and the U-shaped member 96 to form a stop 102. The end of each clip member 100 is hook shaped to grasp the step 83 to retain the clip 92 in alignment with respect to the connecting bore 82.

The connecting bolts 90 are inserted into openings in the cover 54 and connecting bores 82, and screwed into respective clip bores 99 to retain the cover 54 against the shell 52 when the pressure inside the casing 33 is below a predetermined limit. If the pressure inside the casing 33, however, reaches or exceeds the predetermined limit, the U-shaped member 96 deflects toward the casing flange 80 allowing the cover 54 to separate from the shell 52. The stop 102 engages the lower surface of the casing flange 80 thereby limiting the deflection of the U-shaped member 96. It is also possible to use the spring clips 92 with other enclosures.

Figure 7:
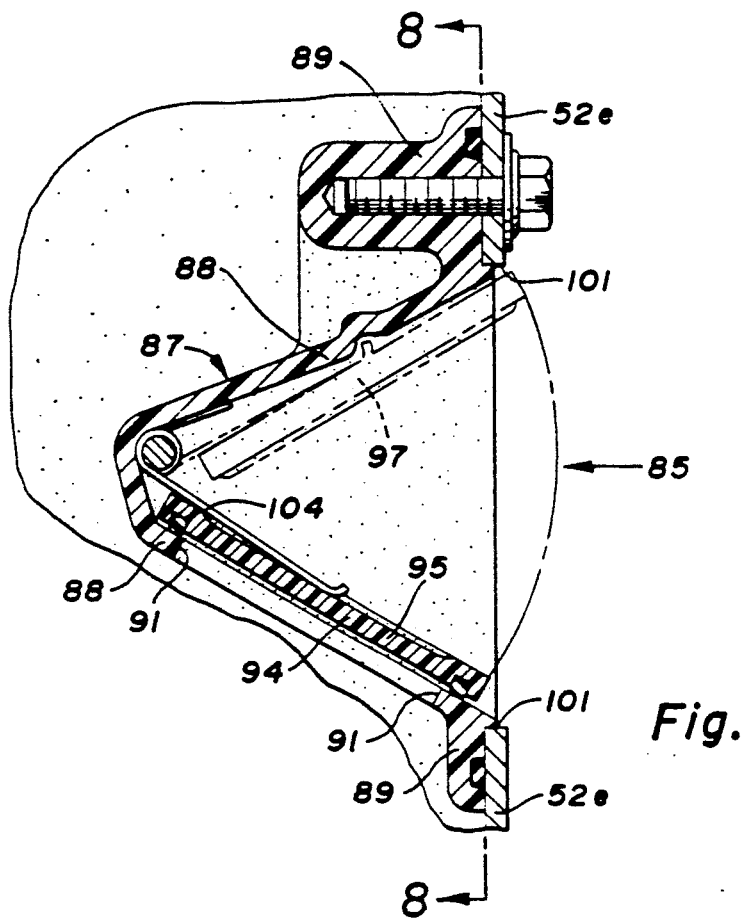
FIG. 7 is an enlarged cross-sectional view of the pressure relief valve generally in the plane indicated by line 7—7 of FIG. 6.
Figure 8:
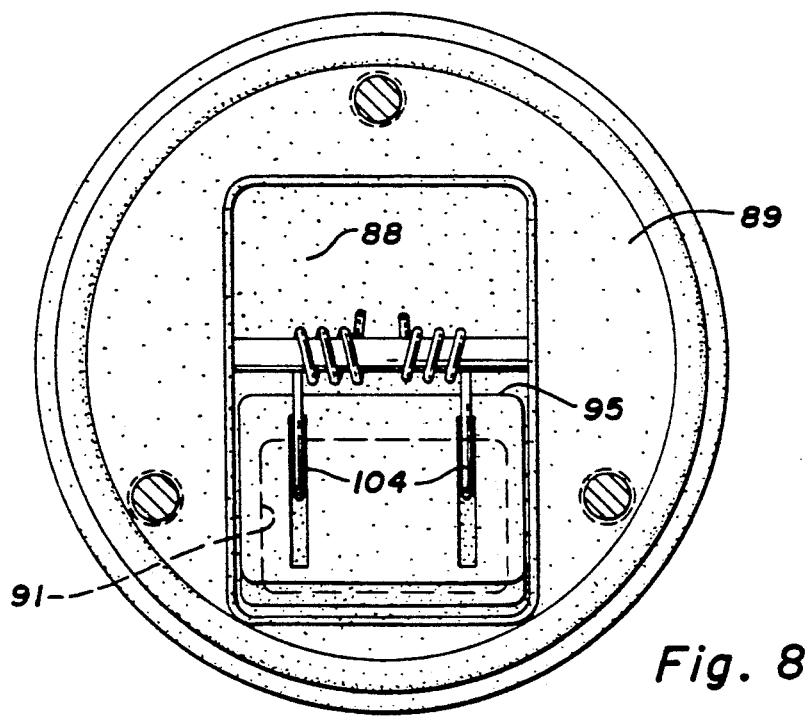
FIG. 8 is an elevational view of the pressure relief valve generally in the plane indicated by line 8—8 of FIG. 7.

As an alternative to the spring clips 92, the casing 33e may include a pressure relief valve 85 shown in FIGS. 7 and 8. The valve 85 comprises a glass-filled nylon valve bracket 87 having opposing valve walls 88 depending from a valve base 89. The valve walls 88 form an acute angle and one of the valve walls has a valve opening 91. Two valve return springs 104 are connected to a nylon valve pane 94, by pins, and to the valve walls 88. The return springs 104 enable the valve pane 94 to pivot between a closed position, indicated by numeral 95, wherein the valve pane overlays the valve opening 91, and an open position, indicated by numeral 97, wherein the valve pane is pivoted away from the valve opening. O-rings are disposed in recesses in the valve pane 94.

The valve base 89 is sealingly attached to the portion of the shell 52e adjacent the vent opening 101 by bolts so that the valve walls 88 extend through the vent opening into the casing 33e. O-rings are disposed in recesses in the valve base 89. The valve pane 94 obstructs communication between the interior and exterior of the casing 33e via the vent opening 101 when the valve pane 94 is in the closed position 95, and allows communication between the interior and exterior of the casing via the vent and valve openings when the valve pane is in the open position 97.

The valve return springs 104 bias the valve pane 94 to the closed position 95 when the pressure difference between the interior and exterior of the casing 33e is below a predetermined limit. The valve return springs 104 deflect to allow the valve pane 94 to pivot to the open position 97 if the pressure difference between the interior and exterior of the casing 33e reaches or exceeds the predetermined limit.

The extension of the valve bracket and pane 87, 94 beyond the shell 52e is substantially less than the dimension of the casing 33e perpendicular to the plane of the vent opening 101. This enables use of the valve 85 without substantially increasing the size of the casing 33e. It is also possible to use the valve 85 with other enclosures.

Air Tubes

As shown in FIGS. 1 and 2, the air tubes 35 are located inside the casing 33 with the individual air tubes in side-to-side relation with respect to one another. The air tubes 35 are arranged so that their centers of curvature are approximately collinear. The inner curves of the air tubes 35 thereby define a cylindrical region constituting the principal portion 105 of the plenum 36.

The air tubes 35 have a two-piece construction. Air tubes 35 having one-piece construction are also possible. The air tubes 35 are constructed of glass and mineral reinforced nylon, and include type 66 nylon. The air tubes 35 may also be formed of metal (e.g., aluminum or magnesium), plastic (e.g., polyethylene or polypropylene) or other types of nylon.

Each air tube 35 has a locator system comprising an integral locator tab 168 projecting from its outer surface above the air tube outlet 40 and an integral locator tab 170 projecting from its outer surface on the opposite side of the air tube. The locator tabs 168, 170 engage the casing 33 to hold the air tubes 35 in alignment with respect to the casing.

Fuel Injection Assembly

The fuel injection assembly 39 shown in FIGS. 1, 2 and 3 includes the fuel injectors 41 and a fuel distribution assembly 84 which connects the fuel injectors and allows fuel to flow to each of them. The fuel distribution assembly 84 includes an injector pod 70 connected to each fuel injector 41 and fuel tubes 114 which serially connect the fuel injectors. The fuel tubes 114 are constructed of plastic, and include type 12 nylon.

Each injector pod 70 is constructed of glass reinforced nylon and includes type 12 or 66 nylon. The injector pod 70 has a hollow injector mounting 126 as shown in FIG. 2. The injector mounting 126 includes an integral injector socket 128 with a cross section which is larger than the cross section of the inlet of the fuel injector 41 so that a fuel injector can be inserted into the socket. Each injector mounting 126 also has a fastening means including an integral inlet ledge 118 and outlet ledge 119 on its outer surface. As shown in FIG. 6, the fastening means may alternatively include three resilient pod latches 121 each comprising a resilient spring arm extending upward from the injector pod 70e, and a resilient finger integral with the end of each spring arm.

Each injector pod 70 has an integral tubular inlet projection 122 extending away from the injector mounting 126 adjacent its inlet ledge 118. The inlet projection 122 registers with an inlet 123 on the injector mounting 126 to allow fuel to flow through the inlet projection into the injector socket 128 to supply the fuel injector 41 retained in it. The inlet projection 122 is inserted into the resilient opening in one end of a fuel tube 114.

Each injector pod 70 has an integral tubular outlet projection 136 extending away from the injector mounting 126 adjacent its outlet ledge 119. The outlet projection 136 registers with an outlet 139 on the injector mounting 126 to allow excess fuel to be discharged from it through the outlet projection. The outlet projection 136 is inserted into the resilient opening in the end of another fuel tube 114.

The injector pod 70 includes an integral shoulder 140 having an eccentric cross section. Each pod socket 72 has a cross section corresponding to that of a shoulder 140. Each pod socket 72 is slightly larger than the corresponding shoulder 140 to enable each shoulder to be inserted into a pod socket. The small clearance between each shoulder 140 and the corresponding pod socket 72 results in resistance to rotation of the shoulder in the pod socket. This facilitates alignment of each fuel injector 41 with respect to the shell 52.

The construction of the injector pods 70 and their connection to the fuel tubes 114 allows fuel to flow through the fuel tubes 114 into each injector pod 70 to supply the respective fuel injector 41 connected to it. The portion of the fuel in each injector pod 70 which does not flow into the associated fuel injector 41 is discharged from the injector pod and allowed to supply the adjacent injector pod. Fuel is thereby able to flow through the string of connected fuel injectors 41 to serially supply each of them.

The fuel distribution assembly 84 includes a stainless steel fuel inlet tube 109 which extends through an opening in the shell 52 and a fuel inlet connector 110. The end of the fuel inlet tube 109 outside the casing 33 is connected to a fuel source and the other end is connected, via the fuel inlet connector 110, to the inlet of the string of connected fuel injectors 41. Fuel is thereby able to flow from the fuel source into the fuel injectors 41.

As shown in FIG. 3, the fuel distribution assembly 84 includes the fuel pressure regulator 108 having an inlet connected to the outlet of the string of connected fuel injectors 41. The fuel distribution assembly 84e may also include a regulator inlet connector 127 having an O-ring for connecting the outlet of the string of connected fuel injectors 41e to the fuel pressure regulator 108e.

The fuel distribution assembly 84 also includes a fuel outlet connector 131 which enables connection of the outlet of the fuel pressure regulator 108 to one end of a stainless steel fuel outlet tube 112. The fuel outlet tube 112 extends outside the casing 33 through an opening in the shell 52. The other end of the fuel outlet tube 112 is connected to a fuel tank outside the casing 33. Fuel is thereby able to flow out of the string of connected fuel injectors 41, through the fuel pressure regulator 108 and the fuel outlet tube 112 to the fuel tank.

Each injector pod 70, with a respective fuel injector 41 and fuel tubes 114 connected to it, is connected to the carrier 42 by inlet and outlet latches 154, 155 extending downward from the carrier. The inlet and outlet latches 154, 155 grasp respective inlet and outlet ledges 118, 119 to hold the injector pod 70 to the carrier 42. Each injector pod 70e may be alternatively connected to the carrier 42e by upward insertion of the pod latches 121 through a slot which extends through the base strip 146e, as shown in FIG. 6.

Carrier

As shown in FIGS. 1, 2 and 3, the carrier 42 comprises a continuous flat base strip 146 disposed between the cover 54 and the casing flange 80. The base strip 146 is releasably connected to the interior of the casing 33 above the injector seats 68 by being clamped between the cover 54 and the casing flange 80, and by the injector pods 70. The injector pods 70 are positioned with respect to the base strip 146 so that, when the base strip is connected to the interior of the casing 33, each of the fuel injectors 41 can inject fuel into a corresponding fluid outlet 32.

As shown in FIG. 3, the base strip 146 has a circular component opening 160 adjacent the fuel outlet tube 112 and three equally spaced integral resilient curved clasps 162 extending into the opening. The regulator housing 164 has a cylindrical regulator flange 166 which, when the regulator housing is inserted upward into the component opening 160, is grasped by the clasps 162 to releasably retain the regulator housing in the component opening. The regulator housing 164 can be removed by pulling it downward out of the component opening 160 causing the clasps 162 to release the regulator flange 166.

As shown in FIG. 3, the base strip 146 has a circular component opening 182 adjacent the air inlet 31 and a component keyway 184 contiguous with the component opening 182. A clasp comprising three equally spaced integral resilient detents 186 extends from the lower surface of the base strip 146 into the component opening 182 at an angle to the base strip.

A temperature sensor 188 comprising a cylindrical sensor housing 190, extends downward through the component opening 182. The sensor housing 190 is constructed of glass filled polyester. A thermistor 192 which produces a non-linear variable electric resistance inversely proportional to its temperature is disposed within the sensor housing 190.

An electrical connector 198 is attached to the top of the sensor housing 190. Leads 199 are soldered to the thermistor 192 and extend through the sensor housing 190 into the electrical connector 198. Sensor wires 200 of a wiring harness 230 extend from the leads 199 out of the electrical connector 198.

As shown in FIG. 3, the pressure sensor 222 includes a sensor element of the conventional type contained in a sensor housing 190b similar to that described above in connection with the temperature sensor 188. Similar parts are identified by the same reference numerals as those used for the temperature sensor 188 with the addition of the suffix b. Sensor wires 200b extend from the sensor housing 190b in a similar manner as the sensor wires 200 extend from the sensor housing 190.

As shown in FIGS. 1, 2, and 3, the base strip 146 has a conduit 178 comprising an integral channel 224 adjacent the inner edge of the base strip. Control wires 228 of the wiring harness 230 extend from each fuel injector 41 and are inserted into the channel 224 from underneath it. The control wires 228 extend through the channel 224 to a wiring harness housing 241 of the wiring harness 230. An alternative conduit 178e is shown in FIG. 6.

As shown in FIGS. 1 and 3, the wiring harness 230 includes a wiring harness housing 241 integral with the base strip 146 next to the air inlet 31. The wiring harness housing 241 is cylindrical and is inserted into an opening in the shell 52.

The wiring harness 230 includes a cylindrical sealing body 242 constructed of absorbent silicone rubber impregnated with silicone fluid. Harness outlets 244 extend through the sealing body 242 and openings in the partition 245. This enables the sensor or control wires 200, 200b, 228 to extend through respective harness outlets 244.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. An integrated induction system to provide fluids to the cylinders in an engine, comprising:
    a casing adapted for mounting on the engine, said casing having an air inlet and a plurality of fluid outlets, each of said fluid outlets being adapted to communicate with a respective cylinder, said casing comprising an enclosure defined by two casing members, said casing including a fastener to securely hold the casing members together;
    a component comprising a plurality of air tubes mounted in the casing to facilitate provision of fluids to the cylinders, said air tubes occupying a portion of the interior of said casing with the unoccupied portion of said casing constituting a plenum, said air tubes being positioned within said casing so that said plenum provides a flow path from said air inlet to said air tubes, one end of each of said air tubes opening from said plenum and the other end of each of said air tubes engaging said casing adjacent one of said fluid outlets to allow communication between said plenum and the cylinders so that air entering into said plenum through said air inlet is introduced via each of said air tubes into the respective cylinders; and
    means for venting said casing when the pressure therein reaches or exceeds a predetermined limit.

2. An integrated induction system as set forth in claim 1 wherein said casing includes a pair of casing members, and said means for venting said casing comprises a spring clip including:
    a U-shaped resilient member having ends adapted to engage the surface of one of said casing members on opposite sides of a connecting bore therein so that the portion of the U-shaped member between said ends is spaced apart from said one casing member, said U-shaped member having an internally threaded clip bore coaxially aligned with the connection bore in said one casing member; and
    a pair of elongate clip members extending from the inner portion of said U-shaped member into the connecting bore in said one casing member, said elongate clip members each having a hook shaped end to grasp said one casing member to retain said clip in alignment with respect to the connecting bore in said one casing member so that a connecting bolt having external threads which correspond to the internal threads in said clip bore may be inserted through a connecting bore in said other casing member and into the connecting bore in said one casing member, and screwed into said clip bore to retain said casing members together when the pressure inside said casing is below a predetermined limit and to enable said U-shaped member to deflect toward the connecting bores when the pressure inside said casing reaches or exceeds said predetermined limit to allow said casing members to separate.

3. An integrated induction system to provide fluids to the cylinders in an engine, comprising:
    a casing adapted for mounting on the engine, said casing including a vent opening, said casing having an air inlet and a plurality of fluid outlets, each of said fluid outlets being adapted to communicate with a respective cylinder;

a component mounted in the casing to facilitate provision of fluids to the cylinders; and means for venting said casing when the pressure therein reaches or exceeds a predetermined limit, said means for venting said casing comprises a pressure relief valve including a valve bracket having opposing valve walls depending from a valve base, said valve walls forming an acute angle, said valve base being adapted for sealing attachment to the portion of said casing which defines said vent opening wherein said valve walls extend through said vent opening into said casing, one of said valve walls having a valve opening, a valve return spring connected to said valve bracket, and a valve pane connected to said valve return spring enabling said valve pane to pivot between a closed position wherein said valve pane overlays said valve opening and an open position wherein said valve pane is pivoted away from said valve opening, said valve pane obstructing communication between the interior and exterior of said casing via said vent opening when said valve pane is in said closed position and allowing said communication via said vent opening and valve opening when said valve pane is in said open position, said valve return spring biasing said valve pane to said closed position when the pressure difference between the interior and exterior of said casing is below a predetermined limit, said valve return spring deflecting to allow said valve pane to pivot to said open position if the pressure difference between the interior and exterior of said casing reaches or exceeds said predetermined limit.

4. A pressure relief valve for an enclosure having a vent opening, said pressure relief valve comprising:

a valve bracket having opposing valve walls depending from a valve base, said valve walls forming an acute angle, said valve base being adapted for sealing attachment to the portion of said casing which defines said vent opening wherein said valve walls extend through said vent opening into said casing, one of said valve walls having a valve opening;

a valve return spring connected to said valve bracket; and a valve pane connected to said valve return spring enabling said valve pane to pivot between a closed position wherein said valve pane overlays said valve opening and an open position wherein said valve pane is pivoted away from said valve opening, said valve pane obstructing communication between the interior and exterior of said casing via said vent opening when said valve pane is in said closed position and allowing said communication via said vent opening and valve opening when said valve pane is in said open position, said valve return spring biasing said valve pane to said closed position when the pressure difference between the interior and exterior of said casing is below a predetermined limit, said valve return spring deflecting to allow said valve pane to pivot to said open position if the pressure difference between the interior and exterior of said casing reaches or exceeds said predetermined limit.

5. An integrated induction system to provide fluids to the cylinders in an engine, comprising:

a casing adapted for mounting on the engine, said casing being formed of plastic, said casing having an air inlet and a plurality of fluid outlets, each of said fluid outlets being adapted to communicate with a respective cylinder, said casing comprising an enclosure;

a component comprising a plurality of air tubes mounted in the casing to facilitate provision of fluids to the cylinders, said air tubes occupying a portion of the interior of said casing with the unoccupied portion of said casing constituting a plenum, said air tubes being positioned within said casing so that said plenum provides a flow path from said air inlet to said air tubes, one end of each of said air tubes opening from said plenum and the other end of each of said air tubes engaging said casing adjacent one of said fluid outlets to allow communication between said plenum and the cylinders so that air entering into said plenum through said air inlet is introduced via each of said air tubes into the respective cylinders; and means for venting said casing when the pressure therein reaches or exceeds a predetermined limit.

* * * * *